United States Patent Office.

HENRY WURTZ, OF NEW YORK, N. Y.

Letters Patent No. 73,860, dated January 28, 1868.

---

IMPROVEMENT IN THE PREPARATION OF GRAHAMITE.

---

The Schedule referred to in these Letters Patent and making part of the same.

---

TO ALL WHOM IT MAY CONCERN:

Be it known that I, HENRY WURTZ, of New York, in the county of New York, in the State of New York, have invented a new and improved mode of operating upon a certain mineral, found forming a vein in the rocks upon McFarland's Run, in Ritchie county, West Virginia, (and known as "Ritchie coal," "Ritchie asphaltum," "crystallized petroleum," &c., but) called by me Grahamite, so as to obtain therefrom new and useful products; and I do hereby declare that the following is a full and exact description thereof.

Description.

The nature of my invention consists in operating upon Grahamite with certain liquid media or menstrua, which I have found to exert thereupon a more or less complete solvent action, for the purpose of separating it from the impurities with which it is naturally commingled, and obtaining it, by subsequent evaporation of the solvent, in a purified resinous form, susceptible of being converted to valuable uses.

In order to enable others to practise and use my invention, I shall proceed to describe my methods of operation.

The products which I obtain in practice from Grahamite by my methods are four in species, according to the solvents I make use of, and the mode of operation.

1. Certain solvents, among which may be mentioned chloroform, bisulphide of carbon, coal-tar benzole, and Grahamite-benzole, dissolve (as I have discovered) substantially the whole mass of the mineral, leaving behind but a small percentage of impurities. With these, therefore, the operation of obtaining pure Grahamite is very simple, and consists simply in digesting the powdered mineral in the solvent until the solution thereof is nearly or quite complete, straining or decanting the liquid, and evaporating or distilling it to dryness in any suitable apparatus. The residue obtained, which constitutes the first species of product, is called by me pure or purified Grahamite.

2. Certain other solvents, among which may be mentioned sulphuric ether and petroleum-naphtha (or so-called "benzine") of commerce, I have found to dissolve Grahamite but partially, separating it into two portions, the portion soluble in these menstrua (when recovered from the solution by distillation or evaporation) being a peculiar resinous or resinoid substance, of a very highly ductile and adhesive consistence when warm, and usually of a peculiar aromatic odor, which constitutes my second species of product, called by me Alpha (or No. 1) Grahamite Resinoid, or Viscosine.

3. After extraction of the above material by the second class of solvents, the remaining pulverulent mass may be thoroughly rinsed with the solvent, and dried; and a third species of product is thus obtained, possessing properties which adapt it for special uses, and which I call Washed Grahamite.

4. The fourth species is obtained simply by treating the washed Grahamite, No. 3, with a solvent belonging to the class specified under 1, which dissolves substantially the whole of the Grahamite, except impurities. Filtering the solution and evaporating, the residuum constitutes my fourth species of product, called by me Beta (or No. 2) Grahamite Resinoid.

This resinoid substance I generally designate also by the name Irisine, in consequence of the magnificent rainbow-colors produced on polished surfaces by the evaporation of its solutions thereon.

Claims.

What I claim as my invention, and desire to secure by Letters Patent, is—

1. The separation, from any impurities with which it may naturally occur commingled, of the mineral substance called by me Grahamite, by the use of a liquid medium or menstruum, substantially as above set forth.

2. The separation of Grahamite into two distinct substances by the action of solvent media or menstrua substantially as above set forth.

In testimony whereof, I have hereunto attached my signature, in the presence of two witnesses, in Washington, this thirty-first day of July, 1867.

HENRY WURTZ.

Witnesses:
  JOHN F. CLARK,
  C. A. SEARS.